A. W. RENDELL.
GRADUATED RELEASE DEVICE.
APPLICATION FILED NOV. 22, 1919.
1,333,937.
Patented Mar. 16, 1920.
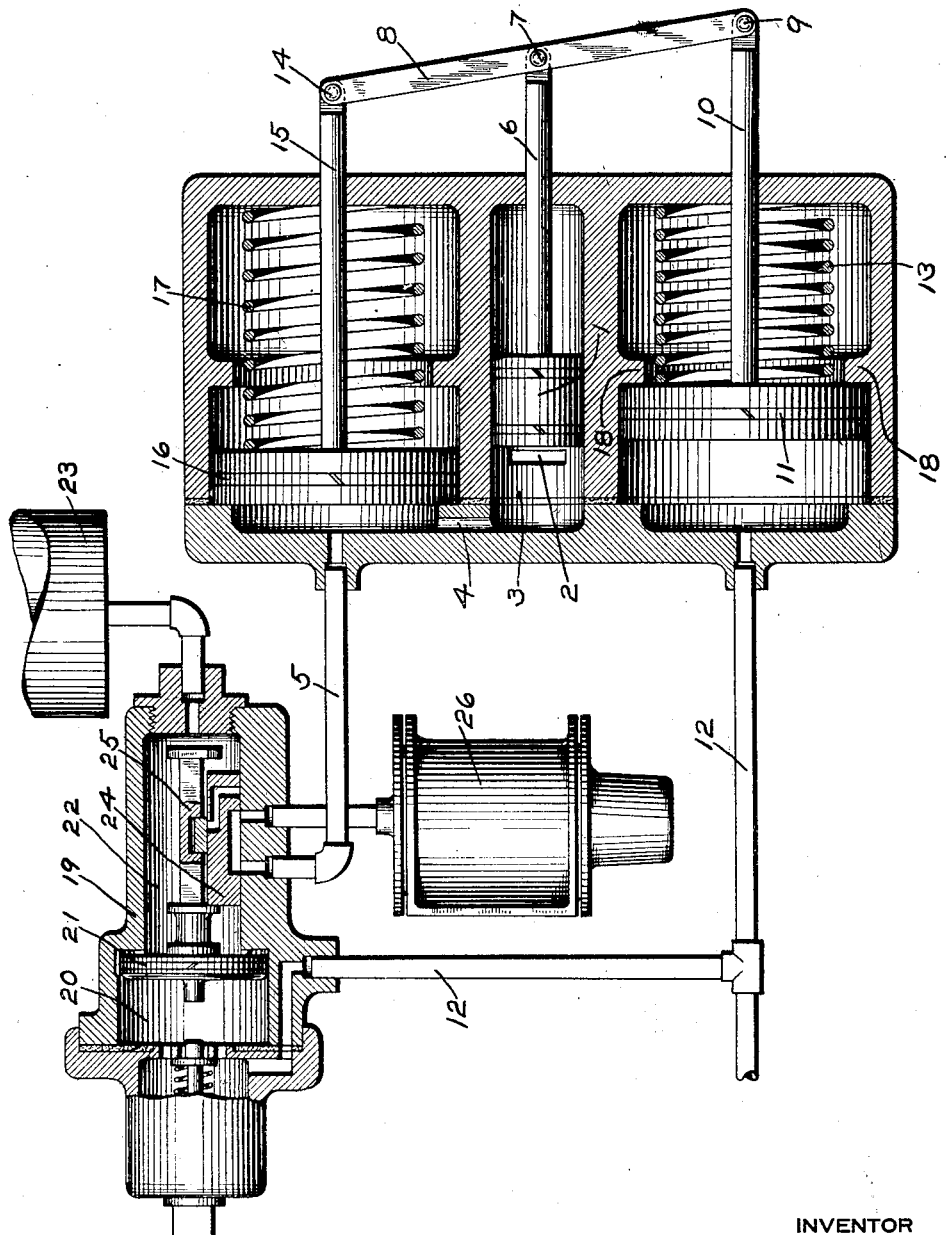
INVENTOR
Alan W. Rendell
BY
*Wm. M. Cady*
ATTORNEY

UNITED STATES PATENT OFFICE.

ALAN W. RENDELL, OF LONDON, ENGLAND.

GRADUATED-RELEASE DEVICE.

1,333,937.      Specification of Letters Patent.      Patented Mar. 16, 1920.

Application filed November 22, 1919. Serial No. 340,067.

*To all whom it may concern:*

Be it known that I, ALAN W. RENDELL, a subject of the King of Great Britain, and a resident of 46 Bullingham Mansions, Church street, Kensington, London, England, have invented a certain new and useful Improvement in Graduated-Release Devices, of which the following is a specification.

This invention relates to fluid pressure braking apparatus of the kind in which the application and release of the brakes is arranged to be controlled by variations in brake pipe pressure and has for its object to provide means whereby, after an application of the brakes has been effected by a reduction in the pressure obtaining in the brake pipe, a graduated release of the brakes may be effected by increasing the brake pipe pressure to an extent depending upon the degree of pressure which it is desired to retain in the brake cylinder, this pressure being preferably directly proportional to the extent to which the pressure in the brake pipe is restored in the usual manner.

According to the present invention this object is attained by providing an outlet from the brake cylinder with a valve which is under the dual control of the pressure obtaining in the brake cylinder and brake pipe respectively, this valve being arranged to be closed only so long as the brake pipe pressure is equal to or less by a predetermined amount than the brake cylinder pressure, and to be maintained open until this condition is attained.

In carrying the invention into practice the dual control of the valve above referred to may be effected by providing a system of levers whereby a differential operation of the valve may be obtained under the control of the brake cylinder and brake pipe pressures or alternatively, the valve itself may be of differential construction.

In the accompanying drawing, the single figure is a diagrammatic view of a fluid pressure brake equipment with my invention applied thereto.

Referring now to the drawing, the valve controlling communication between the brake cylinder and the atmosphere is indicated at 1 as adapted to cover or uncover a port 2 formed in the wall of a chamber 3 communicating through another port 4 with a pipe 5 connected to the exhaust port of a triple valve device 19.

The valve 1 is provided with a valve stem or rod 6 pivotally connected to an intermediate point 7 of a floating lever 8. One fulcrum 9 of the lever 8 is pivotally mounted upon the stem or rod 10 of a piston or abutment 11 subject on one face to the pressure obtaining in the brake pipe 12 and on the other face to the opposing action of a suitable spring 13.

The other fulcrum 14 of the lever 8 is similarly pivotally connected to the stem or rod 15 of a second plunger or abutment 16 subject on one side to the pressure obtaining in the brake cylinder and on the other side to the opposing action of a suitable spring 17.

The triple valve device 19 may be of the usual construction, comprising a casing, having a piston chamber 20, connected to the brake pipe 12 and containing a piston 21, and a valve chamber 22, connected to auxiliary reservoir 23, and containing a main slide valve 24, and a graduating valve 25, adapted to be operated by piston 21 for controlling the admission and release of fluid under pressure to and from the brake cylinder 26.

The operation of this form of apparatus is as follows:—So long as the brake pipe pressure is at its normal value the plunger or abutment 11 subject to this pressure is in its normal or release position against a stop 18, the corresponding spring 13 being fully compressed. The fulcrum 9 of the lever 8 connected to this abutment is thus in one of its extreme positions, for instance its extreme outward position, as shown in the drawing, while the other fulcrum 14 of the lever 8 connected to the plunger or abutment 16 subject to the brake cylinder pressure is on the other hand in these circumstances in its opposite or extreme inward position and is maintained in this position by its corresponding spring 17, in the absence of any pressure in the brake cylinder. The point 7 of the floating lever 8 attached to the valve 1 will therefore be in a position in which said valve opens port 2 and thus communication is established between the atmosphere and pipe 5 leading to the exhaust port of the triple valve 19.

If now a reduction in brake pipe pressure is effected, the abutment 11 subject to the brake pipe pressure will move to the left under the action of its spring 13, carrying with it the floating lever 8, thereby operating the valve 1 to close port 2, the other fulcrum 14 of the lever 8 being for the moment unaffected. The reduction in brake pipe pressure will cause in the usual manner, fluid under pressure to be supplied to the brake cylinder through the triple valve.

After an application of the brakes has been obtained in the manner above described, if the brake pipe pressure is partially restored, the consequent release movement of the triple valve will permit fluid from the brake cylinder to force the plunger 16 to the right and the plunger or abutment 11 being subject to brake pipe pressure will be moved outwardly toward the right, carrying with it the floating lever 8 and by the corresponding movement of the point 7 of this lever, the valve stem 6 is operated to cause valve 1 to open port 2. Communication will thus be established between the triple valve exhaust and the atmosphere through the port 2 until a sufficient amount of fluid has been released from the brake cylinder to permit the inward movement to the left of the plunger or abutment 16, whereupon the valve 1 will be closed and the desired degree of pressure maintained in the brake cylinder.

It will be evident that by suitably proportioning the effective areas of the plungers or abutments 11 and 16 and their controlling springs 13 and 17, the degree of pressure retained in the brake cylinder during a graduated release may be caused to bear any desired relation to the extent to which the pressure in the brake pipe is increased to effect such release.

It will be evident that the valve controlling communication between the brake cylinder and the atmosphere during the release of the brakes may be operated by mechanism other than that above described, for instance the relatively movable elements of the valve may be mounted on the stems of the abutments subject respectively to the fluid pressure obtaining in the brake pipe and brake cylinder instead of employing a floating lever to effect the desired coöperation of these abutments to control the action of the valve.

Having now described my invention, what I claim as new, and desire to secure by Letters Patent, is:—

1. The combination with a brake cylinder and a brake pipe, of a valve device for controlling the release of fluid from the brake cylinder comprising a piston subject to the opposing pressures of the brake cylinder and a spring, a piston subject to the opposing pressures of the brake pipe and a spring, and a valve operated by the joint action of said pistons for controlling the release of fluid from the brake cylinder.

2. The combination with a brake cylinder and a brake pipe, of a valve device for controlling the release of fluid from the brake cylinder comprising a piston subject to the opposing pressures of the brake cylinder and a spring, a piston subject to the opposing pressures of the brake pipe and a spring, a floating lever operatively connecting said pistons, and a valve operatively connected to said lever for controlling the release of fluid from the brake cylinder.

3. The combination with a brake pipe, brake cylinder, and a triple valve device operated upon an increase in brake pipe pressure for connecting the brake cylinder with an exhaust port, of a movable abutment subject to the opposing pressures of a spring and fluid from the triple valve exhaust port, a piston subject to the opposing pressures of a spring and the brake pipe, and a valve controlled by the conjoint action of said pistons for controlling the release of fluid from the brake cylinder.

In testimony whereof I have hereunto set my hand.

ALAN W. RENDELL.